United States Patent [19]
Ballou

[11] 3,740,714
[45] June 19, 1973

[54] TWO-RELAY AUTOMOTIVE VEHICLE SIGNALING SYSTEM

[75] Inventor: Richard P. Ballou, Howell, Mich.

[73] Assignee: General Motors Corporation, Detroit, Mich.

[22] Filed: July 13, 1971

[21] Appl. No.: 162,234

[52] U.S. Cl. .................. 340/67, 240/8.24, 315/82, 340/81 F
[51] Int. Cl. ........................... B60q 1/18, B60q 1/38
[58] Field of Search ..................... 240/8.24; 315/77, 315/82, 83; 340/55, 67, 73, 74, 76, 81

[56] References Cited
UNITED STATES PATENTS

| | | | |
|---|---|---|---|
| 2,611,857 | 9/1952 | Coulter | 340/74 X |
| 2,659,838 | 11/1953 | Du Rocher | 340/55 X |
| 2,907,979 | 10/1959 | Laufzenhiser | 340/54 |
| 3,500,315 | 3/1970 | Shimada | 340/67 X |
| 3,519,986 | 7/1970 | Du Rocher | 340/55 |
| 3,569,780 | 3/1971 | Skinner et al. | 340/81 F X |
| 3,576,530 | 4/1971 | Buechler et al. | 340/81 R |
| 3,562,799 | 12/1968 | Creager et al. | 340/56 |

FOREIGN PATENTS OR APPLICATIONS

| | | | |
|---|---|---|---|
| 474,076 | 8/1952 | Italy | 340/73 |
| 594,588 | 6/1959 | Italy | 340/67 |

Primary Examiner—John W. Caldwell
Assistant Examiner—Kenneth N. Leimer
Attorney—C. R. Meland and Tim G. Jagodzinski

[57] ABSTRACT

A two-relay signaling system for an automotive vehicle in which the contacts of the two relays are operatively associated with the vehicle light switch to provide for the illumination of the left or right cornering light when the vehicle turn signal lever is in the left or right turn signal position and the vehicle light switch is in an on position. In addition, contacts operated by the two relay coils are operatively associated with the vehicle brakes so that the actuation of the vehicle brakes provides a raking signal which overrides a hazard warning signal. A load sensitive flasher is used to flash either the left or right signal lamps to provide a turn signal and a non-load sensitive flasher is used to flash one lamp on each of the left and right front and rear corners of the vehicle to provide a hazard warning, the remaining signal lamps being inoperable during hazard warning.

4 Claims, 1 Drawing Figure

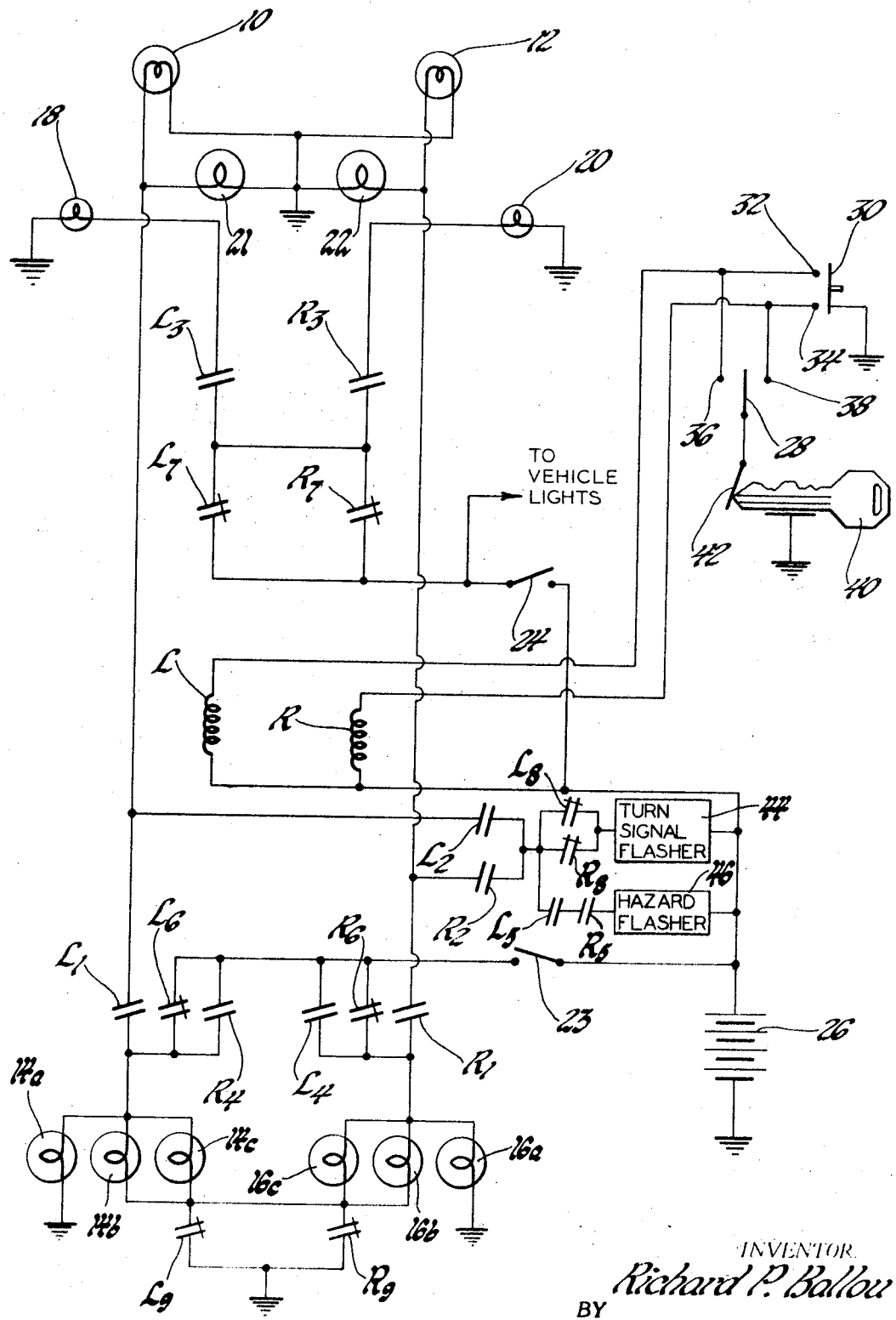

TWO-RELAY AUTOMOTIVE VEHICLE SIGNALING SYSTEM

This invention relates to a signaling circuit for automotive vehicles and more specifically this invention relates to an automotive vehicle signaling circuit in which two relay coils are selectively energized to control their respective contacts to provide for left turn signal, right turn signal, hazard signal, left and right cornering signals and braking signals.

Two-relay signaling systems for automotive vehicles are known. This form of signaling system has the advantages of reducing the number and size of the conductors up the vehicle steering column, permitting the simplification of the turn signal and hazard switches, providing for easier installation of the wiring and signal mechanism and minimizing the effort in servicing and determining the fault location.

It is the general object of this invention to provide for a two-relay automotive vehicle signaling system having features incorporated therein not previously incorporated in two-relay signaling systems while retaining all of the advantages of such systems.

It is another object of this invention to provide for a two-relay automotive vehicle signaling system which includes left and right cornering signals.

It is another object of this invention to provide for a two-relay automotive vehicle signaling system in which the actuation of the brake during a hazard warning signal overrides the hazard warning signal to provide a braking signal.

It is another object of this invention to provide for a two-relay automotive vehicle signaling system in which a load sensitive flasher is used to flash either the left or right signal lamps to provide left or right turn signals, respectively, and a non-load sensitive flasher is used to flash left and right signal lamps to provide hazard warning.

It is another object of this invention to provide for a two-relay automotive vehicle signaling system in which all but one lamp in each corner of the vehicle is made inoperative during hazard warning to conserve the available power in the vehicle battery.

The invention may be best understood by reference to the following description of a preferred embodiment and The FIGURE which is a schematic drawing of the preferred embodiment of this invention.

Referring to the Figure, there is shown an automotive signaling circuit having a left front signal lamp 10, a right front signal lamp 12, left rear signal lamps 14a, 14b and 14c, right rear signal lamps 16a, 16b and 16c, a left cornering lamp 18, a right cornering lamp 20, a left pilot lamp 21 and a right pilot lamp 22. These signal lamps are controlled by the selective energization of a left turn relay coil L and a right turn relay coil R in conjunction with the actuation of a vehicle brake switch 23 and a vehicle light switch 24.

The left and right pilot lamps 21 and 22 are located in the vehicle driving compartment so as to be easily observed by the vehicle operator.

The vehicle brake switch 23 is a conventional vehicle brake switch which is closed upon the actuation of the vehicle brakes. Similarly, the light switch 24 is a conventional vehicle light switch which is closed to supply power from a vehicle battery 26 to energize the vehicle lights (not shown).

The left turn relay coil L is operable when energized to close the sets of normally open contacts L1 through L5 and to open the sets of normally closed contacts L6 through L9. The right turn relay coil R is operable when energized to close the sets of normally open contacts R1 through R5 and to open the sets of normally closed contacts R6 through R9.

The left turn relay coil L and the right turn relay coil R are selectively energized by completing a circuit from the vehicle battery 26 through the coils L and R to ground through either the turn signal switch 28 or the hazard switch 30. The hazard switch 30 energizes both the left turn relay coil L and the right turn relay coil R simultaneously by grounding the terminals 32 and 34. The left turn relay coil L and the right turn relay coil R are energized individually by positioning the turn signal switch 28 against a terminal 36 or a terminal 38 respectively when the vehicle key 40 is inserted in the vehicle ignition switch to ground a contact 42. As can be seen the coils L and R can be energized individually only when the key 40 is inserted in the vehicle ignition switch. The ignition switch, turn signal switch 28 and hazard switch 30 are all on the steering column, thereby requiring only two wires up the steering column.

With the turn signal switch 28 and the hazard warning switch 30 in the neutral positions as shown, actuation of the vehicle brakes closes the vehicle brake switch 23 to supply power from the vehicle battery 26 to the left rear signal lamps 14a, 14b and 14c and the right rear signal lamps 16a, 16b and 16c through the sets of normally closed contacts L6 and R6, respectively, to provide for a braking signal. The left rear signal lamps 14b and 14c and the right rear signal lamps 16b and 16c are energized through the normally closed parallel contacts L9 and R9. As can be seen, the left front signal lamp 10 and the right front signal lamp 12 are isolated from the battery 26 by the sets of normally open contacts L1, L2, R1 and R2.

To signal a left turn, the turn signal switch 28 is positioned to contact the terminal 36 to complete a circuit from the vehicle battery 26, through the left turn relay coil L, the terminal 36, the turn signal switch 28, the contact 42 and the vehicle ignition key 40 to ground. The left turn relay coil L is thereby energized for as long as the turn signal switch 28 remains in this position and the key remains in the ignition switch. Upon the energization of the left turn relay coil L, the set of normally open contacts L1 is closed to connect the left front signal lamp 10 and the left rear signal lamps 14a, 14b and 14c together and the set of normally open contacts L2 is closed to complete a circuit from the vehicle battery 26 through a turn signal flasher 44, the set of normally closed contacts R8 and the left front signal lamp 10 and the left pilot lamp 21 to ground and through the flasher 44, the set of normally closed contacts R8 and the left rear signal lamps 14a, 14b and 14 c to ground. The left front signal lamp 10, the left pilot lamp 21 and the left rear signal lamps 14a, 14b and 14c are then periodically flashed to signal a left turn.

The turn signal flasher 44 may be any one of many forms of load sensitive flashers known in the art and may be, for example, the conventional vehicle hot wire flasher. This flasher is made load sensitive so as to provide an indication of lamp failure by not flashing when its load changes due to a lamp failure. This can be observed by monitoring the pilot lamps 21 and 22.

Upon the energization of the left turn relay coil L, the sets of normally closed contacts L6 through L9 are opened and the sets of normally open contacts L3 through L5 are closed. If the vehicle light switch 24 is closed, a circuit is completed from the vehicle battery 26, through the light switch 24, the set of normally closed contacts R7, the set of normally open contacts L3 and the left cornering light 18 to ground. The left cornering light 18 is therefore illuminated for as long as both the left turn relay coil L is energized and the light switch 24 is closed. If the brake switch 23 is closed while the left turn relay coil L is energized, a circuit is completed from the vehicle battery 26, through the brake switch 23, the set of normally closed contacts R6 and the set of normally open contacts L4 and the right rear signal lamp 16a to ground and the right rear signal lamps 16b and 16c and the set of normally closed contacts R9 to ground. The right rear signal lamps 16a, 16b and 16c are thereby continually energized to provide a braking signal. During the signaling of a left turn, the set of normally closed contacts L6 are open to isolate the left rear signal lamps 14a, 14b and 14c from the brake switch 23.

To signal a right turn, the turn signal switch 28 is positioned to contact the terminal 38 to complete a circuit from the vehicle battery 26, through the right turn relay coil R, the terminal 38, the turn signal switch 28, the contact 42 and the vehicle ignition key 40 to ground. The right turn relay coil R is thereby energized as long as the turn signal switch 28 remains in this position and the key 40 remains in the ignition switch. Upon the energization of the right turn relay R, the set of normally open contacts R1 is closed to connect the right front signal lamp 12 and the right rear signal lamps 16a, 16b and 16c together and the set of normally open contacts R2 is closed to complete a circuit from the vehicle battery 26, through the turn signal flasher 44, the set of normally closed contacts L8 and the right front signal lamp 12 and the right pilot lamp 22 to ground and through the flasher 44, the set of normally closed contacts L8 and the right rear signal lamps 16a, 16b and 16c to ground. The right front signal lamp 12, the right pilot lamp 22 and the right rear signal lamps 16a, 16b and 16c are then periodically flashed to signal a right turn.

Upon the energization of the right turn relay coil R, the sets of normally open contacts R3 through R5 are closed and the sets of normally closed contacts R6 through R9 are opened. If the vehicle light switch 24 is closed, a circuit is completed from the vehicle battery 26 through the light switch 24, the set of normally closed contacts L7, the set of normally open contacts R3 and the right cornering lamp 20 to ground. The right cornering lamp 20 is therefore illuminated for as long as both the right turn relay coil R is energized and the light switch 24 is closed. If the vehicle brake switch 23 is closed while the right turn relay coil R is energized, a circuit is completed from the vehicle battery 26 through the brake switch 23, the set of normally closed contacts L6 and the set of normally open contacts R4 and the left rear signal lamp 14a to ground and the left rear signal lamps 14b and 14c and the set of normally closed contacts L9 to ground. The left rear signal lamps 16a, 16b and 16c are thereby continually energized to provide a braking signal. As can be seen, the right rear signal lamps 16a, 16b and 16c are isolated from the vehicle brake switch 23 by the opening of the set of normally closed contacts R6.

To provide for hazard warning, the hazard warning switch 30 is actuated to contact the terminals 32 and 34 to complete a circuit from the vehicle battery 26, through the left turn relay coil L and the right turn relay coil R to ground. Upon the energization of the left and right turn relays L and R, the sets of normally closed contacts L7 and R7 are opened to render the cornering lights 18 and 20 inoperable, the sets of normally closed contacts L8 and R8 are opened to render the turn signal flasher 44 inoperable and the sets of normally closed contacts L9 and R9 are opened to render the left rear signal lamps 14b and 14c and the right rear signal lamps 16b and 16c inoperable. In this manner, unnecessary drain on the vehicle battery 26 during hazard warning is prevented.

Also, upon the energization of the left and right turn relays L and R, the sets of normally open contacts L1 and R1 are closed to connect the left front signal lamp 10 to the left rear signal lamp 14a and to connect the right front signal lamp 12 to the right rear signal lamp 16a and the sets of normally open contacts R2, L2, R5 and L5 are closed to complete a circuit from the vehicle battery 26, through a hazard flasher 46, the sets of normally open contacts L5 and R5 and the sets of normally open contacts L2 and R2 to periodically flash the left and right front signal lamps 10 and 12, the left and right rear signal lamps 14a and 16a and the left and right pilot lamps 21 and 22 in the same manner as described with reference to left and right turn signals.

The hazard flasher 46, which was maintained inoperable during left and right turn signaling by the normally open sets of contacts R5 and L5, respectively, is a non-load sensitive flasher which will continue to flash even though its load has changed due to a signal lamp failure. The hazard flasher 46 may be any one of many forms of non-load sensitive flashers known in the art.

When both the coils L and R are energized, the sets of normally open contacts R4 and L4 are closed to complete a circuit to each of the signal lamps 10, 12, 14a and 16a from the brake switch 23 to provide for a brake override of the hazard warning.

If other means are provided to indicate the failure of an indicating lamp, the load sensitive flasher 44 would not be required and a single non-load sensitive flasher such as the hazard flasher 46 could be used by connecting the non-load sensitive flasher directly between the vehicle battery 26 and the sets of normally open contacts L2 and R2 and eliminating the sets of normally open contacts L5 and R5 and the sets of normally closed contacts L8 and R8.

The preferred embodiment described uses ground wire control for illustration purposes only. The mechanization of the present invention using hot wire control would be obvious to one skilled in the art.

The detailed description of the preferred embodiment of the invention for the purpose of explaining the principles thereof is not to be considered as limiting or restricting the invention, since many modifications may be made by the exercise of skill in the art without departing from the scope of the invention.

What is claimed is:

1. A vehicle lighting system comprising: lights normally energized for night operation; a manually operable light switch for energizing the lights; left and right signal lights effective for turn and hazard warning signals; a turn signal switch; a hazard warning switch; left and right cornering lights; a normally open ignition switch, the ignition switch being closed when the vehicle is in operation; a left turn relay including a coil in series with the turn signal switch and the ignition switch, first and second sets of normally open contacts and a set of normally closed contacts, the coil being energized when the turn signal switch is in a left turn position and the vehicle is in operation; a right turn relay including a coil in series with the turn signal switch and the ignition switch, first and second sets of normally open contacts and a set of normally closed contacts, the coil being energized when the turn signal switch is in a right turn position and the vehicle is in operation; means connecting both of the left and right relay coils to the hazard warning switch for energizing both the left and right relay coils upon operation of the hazard warning switch; means for flashing the left signal lamps through the first set of normally open contacts of the left turn relay when the left turn relay coil is energized and flashing the right signal lamps through the first set of normally open contacts of the right turn relay when the right turn relay coil is energized; a first series circuit in parallel with the vehicle lights, the first series circuit including the left cornering light, the second set of normally open contacts of the left turn relay and the normally closed contacts of the right turn relay; and a second series circuit in parallel with the vehicle lights, the second series circuit including the right cornering light, the second set of normally open contacts of the right turn relay and the normally closed contacts of the left turn relay, whereby the left cornering light is energized when the left turn relay coil is energized to signal a left turn and the vehicle lights are energized, the right cornering light is energized when the right turn relay coil is energized to signal a right turn and the vehicle lights are energized, and both the left and right cornering lights remain extinguished when both the left and right relay coils are energized upon operation of the hazard warning switch.

2. A vehicle lighting system comprising: left front, right front, left rear and right rear signal lights effective for turn, hazard and brake warning signals; a turn signal switch; a hazard warning switch; a brake switch; a current source; a left turn relay including a coil, first, second and third sets of normally open contacts and a set of normally closed contacts, the coil being energized by the turn signal switch in a left turn position; a right turn relay including a coil, first, second and third sets of normally open contacts and a set of normally closed contacts, the coil being energized by the turn signal switch in a right turn position; means connecting both of the left and right relay coils to the hazard warning switch for energizing both the left and right relay coils upon operation of the hazard warning switch; flasher means; means for coupling the flasher means to the left rear signal lamp through the first and second sets of normally open contacts of the left turn relay and to the left front signal lamp through the second set of normally open contacts of the left turn relay to flash the left front and left rear signal lamps when the left turn relay coil is energized; means for coupling the flasher means to the right rear signal lamp through the first and second sets of normally open contacts of the right turn relay and to the right front signal lamp through the second set of normally open contacts of the right turn relay to flash the right front and right rear signal lamps when the right turn relay coil is energized; and a brake signal circuit including a first series circuit comprising the current source, the brake switch, the parallel combination of the normally closed contacts of the left turn relay and the third set of normally open contacts of the right turn relay and the left rear signal lamp and a second series circuit comprising the current source, the brake switch, the parallel combination of the normally closed contacts of the right turn relay and the third set of normally open contacts of the left turn relay and the right rear signal lamp, whereby the left rear signal lamp is continually energized and the right rear and right front signal lamps are flashed when the right turn relay coil is energized and the vehicle brakes are actuated, the right rear signal lamp is continually energized and the left rear and left front signal lamps are flashed when the left turn relay coil is energized and the vehicle brakes are actuated and the left and right rear signal lamps are continually energized when the left and right turn relay coils are energized upon the operation of the hazard warning switch and the vehicle brakes are actuated.

3. A vehicle lighting system comprising: left and right front signal lamps; a plurality of left rear signal lamps and a plurality of right rear signal lamps effective for turn and hazard signals; a turn signal switch; a hazard switch; a current source; a flasher; a left turn relay including a coil, a set of normally open contacts and a set of normally closed contacts, the coil being energized by the turn signal switch in a left turn position; a right turn relay including a coil, a set of normally open contacts and a set of normally closed contacts, the coil being energized by the turn signal switch in a right turn position; means connecting both the left and right turn relay coils to the hazard warning switch so as to energize both the left and right relay coils upon operation of the hazard warning switch; a left turn signal circuit including the series combination of the current source, the flasher and the set of normally open contacts of the left turn relay, the series combination being connected in parallel with the left front signal lamp, at least one of the left rear signal lamps and a series combination of the remaining left rear signal lamps connected in parallel and the set of normally closed contacts of the right turn relay; and a right turn signal circuit including the series combination of the current source, the flasher and the set of normally open contacts of the right turn relay, the series combination being connected in parallel with the right front signal lamp, at least one of the right rear signal lamps and a series combination of the remaining right rear signal lamps connected in parallel and the set of normally closed contacts of the left turn relay, whereby the left rear signal lamps in series with the set of normally closed contacts of the right turn relay are operable when the left turn relay coil is energized by the turn signal switch and inoperable when the left and right turn relay coils are energized by the hazard warning switch and the right rear signal lamps in series with the set of normally closed contacts of the left turn relay are operable when the right turn relay coil is energized by the turn signal switch and inoperable when the left and right turn relay coils are energized by the hazard warning switch.

4. A vehicle lighting system comprising: left and right signal lamps effective for turn and hazard signals; a turn signal switch; a hazard switch; a current source; a left turn relay including a coil, first and second sets of normally open contacts and a set of normally closed contacts, the coil being energized by the turn signal switch in a left turn position; a right turn relay including a coil, first and second sets of normally open contacts and a set of normally closed contacts, the coil being energized by the turn signal switch in a right turn position; means connecting both the left and right turn relay coils to the hazard warning switch so as to energize both the left and right relay coils upon operation of the hazard warning switch; a left turn signal circuit including the series combination of the current source, a turn signal flasher, the parallel combination of the set of normally closed contacts of the left turn relay and the set of normally closed contacts of the right turn relay, the first set of normally open contacts of the left turn relay and the left signal lamps; a right turn signal circuit including the series combination of the current source, the turn signal flasher, the parallel combination of the set of normally closed contacts of the left turn relay and the set of normally closed contacts of the right turn relay, the first set of normally open contacts of the right turn relay and the right signal lamps; a hazard signal circuit including the series combination of a hazard flasher, the second set of normally open contacts of the left turn relay and the second set of normally open contacts of the right turn relay in parallel with the series combination of the turn signal flasher and the parallel combination of the set of normally closed contacts of the left turn relay and the set of normally closed contacts of the right turn relay, whereby the hazard flasher is inoperable when either the left or right relay coil is energized to provide a left or right turn signal and the turn signal flasher is inoperable when both the left and right relay coils are energized to provide hazard warning.

* * * * *